UNITED STATES PATENT OFFICE.

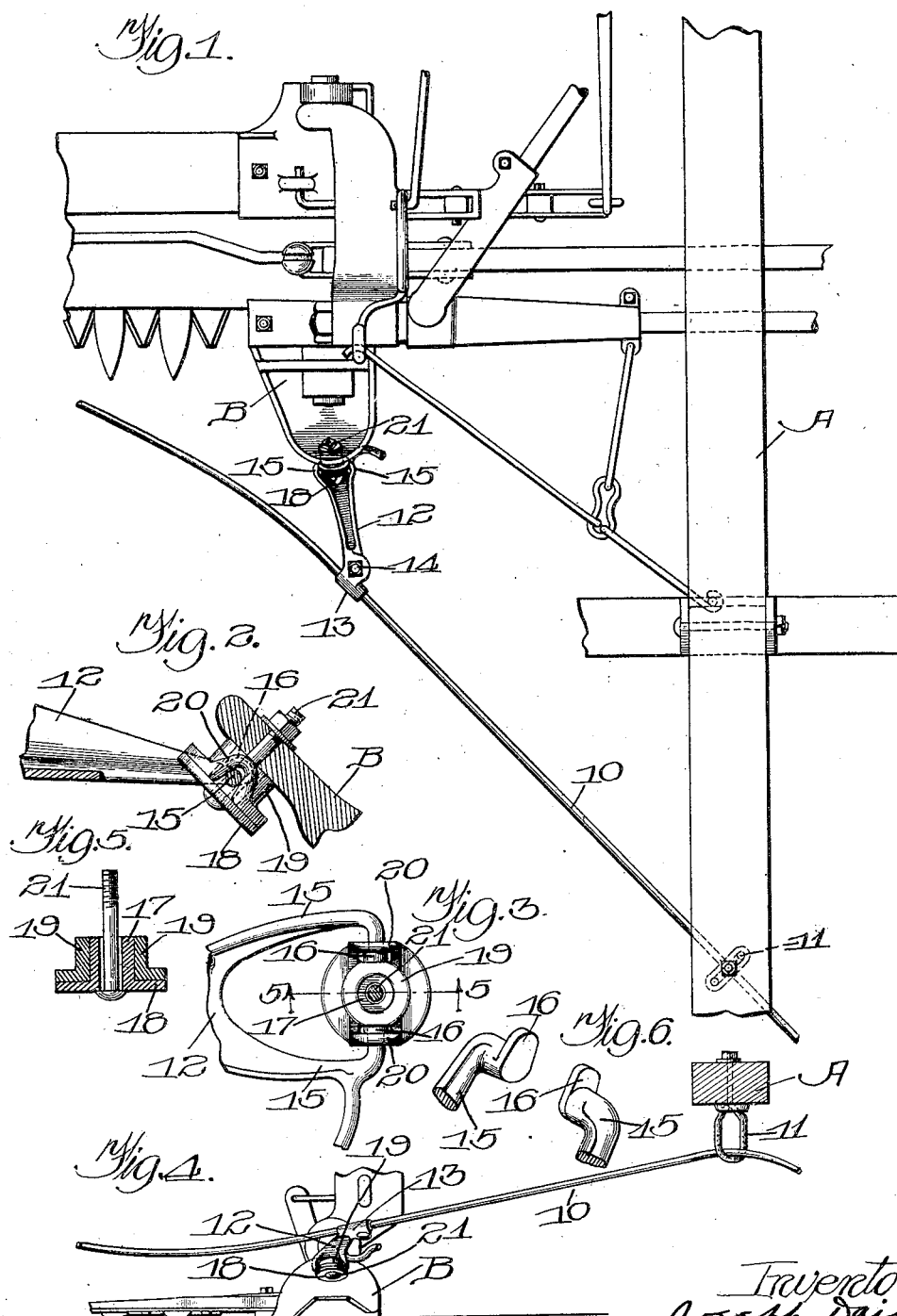

JOSEPH DAIN, OF OTTUMWA, IOWA.

FENDER-ROD FOR MOWERS.

No. 921,955.  Specification of Letters Patent.  Patented May 18, 1909.

Application filed September 2, 1908. Serial No. 451,375.

*To all whom it may concern:*

Be it known that I, JOSEPH DAIN, a citizen of the United States, residing at Ottumwa, in the county of Wapello and State of Iowa, have invented certain new and useful Improvements in Fender-Rods for Mowers, of which the following is a specification, reference being had to the accompanying drawings.

This invention relates to fender-rods intended for use on mowers to prevent heavy masses of cut grass accumulating on different parts of the machine to such an extent as to press down the uncut grass and prevent its ready cutting. A fender-rod for the purpose must be located a short distance in advance of the inner-shoe of the mower, and it is customary to connect the rod with such shoe so as to properly support such rod. To effect this connection it has been proposed to form integral with the fender-rod a branch or arm that had its rear end connected to the shoe, and fender-rods have been so manufactured and used, and while it is advantageous to so construct the device in that it is not liable to present any joint or projection at the point of juncture of the rod and the branch or arm in which grass may catch, that advantage is not sufficient to compensate for the frequent breakage at that point, the inability to adjust the fender-rod and the expense of manufacturing it in that manner.

By my invention I overcome the objections mentioned and provide a cheap, strong, and serviceable device that is flexibly connected to the shoe so as not to be wrenched and distorted by the movements of the shoe, all of which I accomplish by the means shown in the drawings and hereinafter described.

That which I believe to be new will be pointed out in the claims.

In the drawings,—Figure 1 is a top or plan view of so much of a mower as is necessary to illustrate my invention, my improvements being shown applied thereto. Fig. 2 is a detail being a side elevation, partly in section, illustrating the connection of the fender-rod with the mower shoe, the portion of the shoe shown being in vertical section. Fig. 3 is a top or plan view of that end of the arm that branches from the fender-rod that is connected to the mower-shoe, and showing also the parts that serve to make the universal connection between said arm and shoe. Fig. 4 is a side elevation of the fender-rod in place, some parts of the mower also being shown. Fig. 5 is a central vertical section at line 5—5 of Fig. 3 through the short sleeve and the cap mounted thereon that are employed as connecting means between the fender-rod arm and the mower-shoe, and Fig. 6 is a detail, enlarged, showing the end portions of the fingers at the shoe-engaging end of the fender-rod arm.

Referring to the several figures of the drawing in which corresponding parts are indicated by like reference characters,—A indicates a tongue of a mower, and B the usual inner shoe of a mower. I do not deem it necessary to particularly indicate any other parts of the mower shown, as these will be the only parts necessary to refer to in describing my improved fender-rod.

10 indicates the fender-rod preferably formed of a cylindrical iron bar, as usual, and properly curved at its inner or rear end so as to lie in proper relation to the cutter-bar and curved slightly at its other end to properly enter and rest in an eye 11 depending from the under face of the tongue A. There is nothing novel in the shape of the rod 10 itself.

12 indicates an arm secured to the rod 10 at a point about one third of the length of the rod from its rear end which arm is secured at its rear end, by the means hereinafter described, to the forward portion of the shoe B. The outer or forward end of this arm 12 has formed with it a sleeve portion 13, split for a portion of its length, and held clamped rigidly to the rod by a bolt 14. By this means it is evident that the arm can be adjusted exactly as required to bring it in proper position for attachment at its other end to the shoe, and if broken may be readily replaced by another one without having to replace the rod portion 10. The rear or inner end of this arm 12 is formed to provide two oppositely located fingers 15 projecting rearwardly from opposite sides of the arm, said fingers at their ends being turned toward each other and each of said ends having a flange portion 16.

17 indicates a short sleeve with which is formed at its lower end a wide flange 18. 19 indicates a cap surrounding said sleeve 17, said cap resting on the flange 18 of said sleeve.

20 indicates two yokes, one on each side of and integral with the cap 19, each adapted to fit over one of the curved fingers 15 and each standing sufficiently distant from the side of the cap to permit one of the flanges 16 on the fingers to project into the space between it and the cap when the parts are assembled, as shown in Fig. 3.

The connecting of the arm 12 to the mower-shoe is made as follows: The cap 19 is placed on the two turned ends of the fingers 15 in such manner that the two yokes 20 will slip over and embrace such ends, the two flanges 16 on such ends of course entering the space or openings left between the yokes and the outer face of the cap. The short sleeve is then inserted through the hollow cap until its flange 18 bears against the lower end of the cap thereby securing the fingers from withdrawal from the yokes. The end of the cap is then placed against the face of the shoe B and the several parts are held together by a suitable bolt 21 passed through the sleeve 17 and the shoe, the bolt being secured by a nut, as usual.

By the means described a joint between the arm 12 and the mower-shoe is provided that permits of relative motion between the arm and the shoe in all directions which is of great importance in order to prevent strain and breakage, as will be well understood. This movement in all directions is permitted by reason of the lateral play allowed by the sleeve and bolt and the up and down movement allowed by the journaling of the turned end of the curved fingers in the yokes on the cap. By providing the flanges 16 on the turned ends of the curved arms 15 and holding such flanges in their respective spaces between the yokes 20 and the cap the fingers 15 are restrained from any tendency toward lateral movement away from the cap without in any wise disturbing the necessary relative rocking movement between the arm and the mower-shoe. While the connection between the mower-shoe and the rod 12 is such as to permit of said up and down movement relatively between the shoe and the arm, as is necessary owing to the movement of the machine as a whole when passing over uneven ground, it is evident that the arm cannot turn sufficiently to allow its forward end to drop to the ground owing to the fact that such forward end is rigidly secured to the fender rod and the forward end of the fender rod is supported from the tongue A of the machine.

Owing to the different kinds of grass in which a mower is used, as well as variations in heaviness in the same kind of grass, it is essential for the best results that the rod be capable of being arranged to suit the particular conditions of work presented. Loosening the bolt 14 will permit the rod to be twisted or turned in its supporting sleeve 13 so as to raise or lower as desired that end of the rod nearest the cutter-bar. Furthermore, the rod, while stiff enough to maintain its integrity as a whole under normal conditions, can be bent by hand to slightly change its shape sufficiently to adapt it more perfectly to the work required.

That which I claim as my invention and desire to secure by Letters Patent is,—

1. The combination with a mower, of a fender-rod, an arm carried by said rod, and means for connecting the said arm to the inner shoe of the mower, said connecting means being adapted to permit a relative lateral movement and an up and down movement between the arm and the shoe.

2. The combination with a mower, of a fender-rod, an arm adjustably connected to said rod, and means for connecting the said arm to the inner shoe of the mower, said connecting means being adapted to permit a relative lateral movement and an up and down movement between the arm and the shoe.

3. The combination with a mower, of a fender-rod, an arm carried by said rod and provided at its rear end with two fingers, and means for connecting said arm to the inner shoe of the mower, said connecting means being located between and engaging said fingers and being adapted to permit a relative lateral movement and an up and down movement between the arm and said shoe.

4. The combination with a mower, of a fender-rod, an arm carried by said rod and provided at its rear end with two fingers, the end of said fingers being turned inward toward each other and means for connecting said arm to the inner shoe of the mower, said connecting means being located between and engaging said fingers and being adapted to permit a relative movement between the arm and said shoe.

5. The combination with a mower, of a fender-rod, an arm carried by said rod and provided at its rear end with two fingers, the ends of said fingers being turned inward toward each other and means for connecting said arm to the inner shoe of the mower, said connecting means being located between and engaging said fingers and being adapted to permit a relative lateral movement and an up and down movement between the arm and said shoe.

6. The combination with a mower, of a fender-rod, an arm carried by said rod and provided at its rear end with two fingers, the ends of said fingers being turned inward toward each other, and means for connecting said arm to the inner shoe of the mower, said connecting means being located between said fingers and comprising a cap journaled on said turned ends of the fingers and a bolt passing through said cap and the said shoe.

7. The combination with a mower, of a fender-rod, an arm carried by said fender-rod and provided at its rear end with two fingers, the ends of said fingers being turned inward, and means for connecting said arm to the inner shoe of the mower, said connecting means being located between said fingers and comprising a short sleeve, a cap journaled on said sleeve and also journaled on said turned fingers, and a bolt passing through said cap and the said shoe.

8. The combination with a mower, of a fender-rod, an arm carried by said fender-rod and provided at its rear end with two fingers, the ends of said fingers being turned inward, and means for connecting said arm to the inner shoe of the mower, said connecting means being located between said fingers and comprising a short sleeve, a cap journaled on said sleeve and also journaled on said turned fingers, said cap having two yokes that embrace said turned fingers, and a bolt passing through said cap and the said shoe.

9. The combination with a mower, of a fender-rod, an arm carried by said fender-rod and provided at its rear end with two fingers, the ends of said fingers being turned inward and having a flange on each of said inwardly turned ends, and means for connecting said arm to the inner shoe, said connecting means being located between said fingers and comprising a cap having two oppositely located yokes adapted to embrace said fingers beyond said flanges, means for preventing the withdrawal of the fingers from engagement with the yokes, and a bolt passing through said cap and the said shoe.

10. The combination with a mower, of a fender-rod, an arm carried by said fender-rod and provided at its rear end with two fingers, the ends of said fingers being turned inward and having a flange on each of said inwardly turned ends, and means for connecting said arm to the inner shoe, said connecting means being located between said fingers and comprising a short sleeve having a flange at one end, a cap mounted on said sleeve and having two oppositely located yokes adapted to embrace said fingers beyond said flanges, the flange on said sleeve extending opposite the open ends of the yokes to prevent the withdrawal of the fingers therefrom, and a bolt passing through said cap and the said shoe.

JOSEPH DAIN.

Witnesses:
C. A. LASSER,
W. G. DUFFIELD.